April 3, 1951 R. H. CAMPBELL 2,547,854
INTERCOMMUNICATION APPARATUS
Filed Feb. 6, 1948
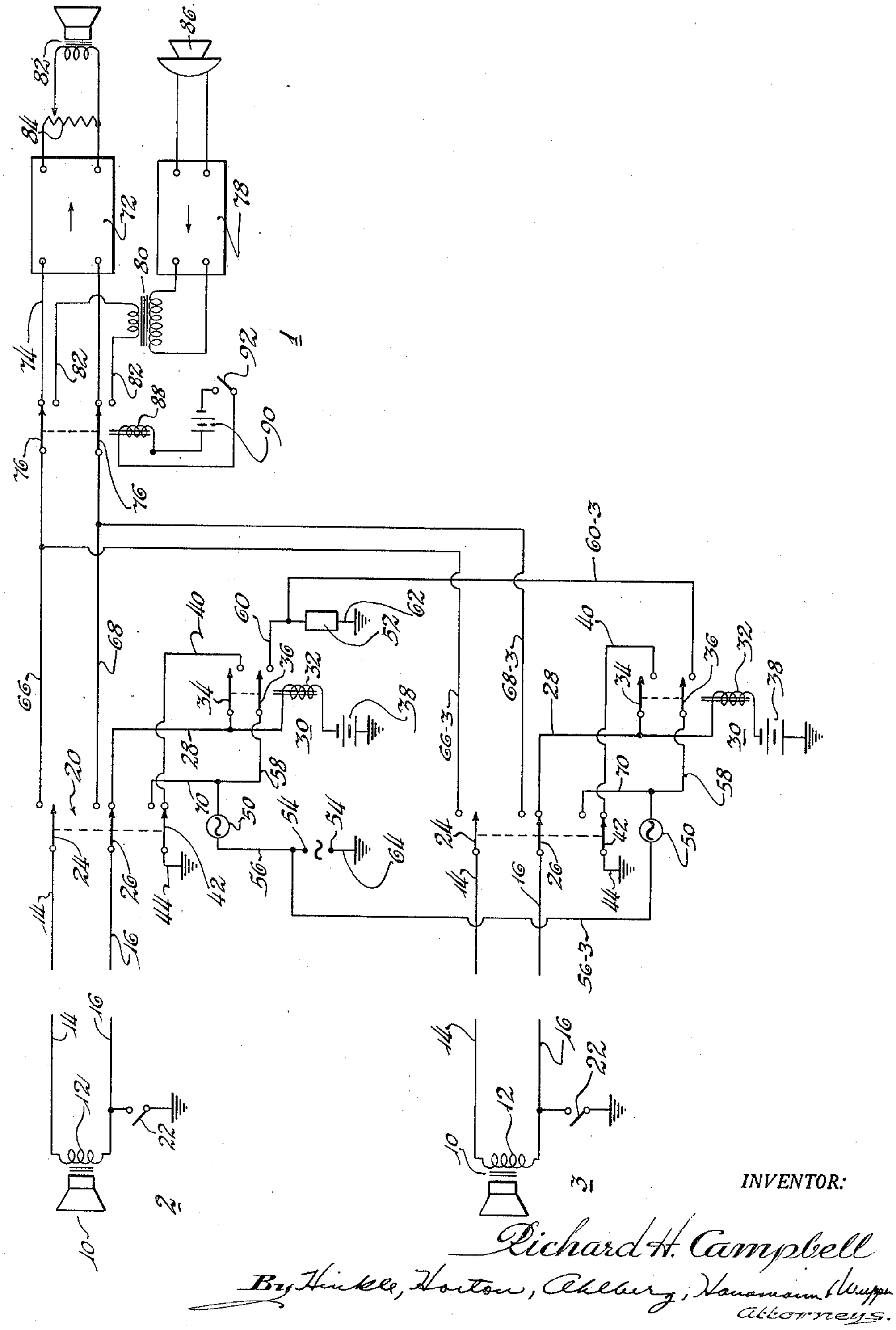
INVENTOR:
Richard H. Campbell
By Hinkle, Horton, Ahlberg, Hanemann & Wupper
Attorneys.

Patented Apr. 3, 1951

2,547,854

UNITED STATES PATENT OFFICE 2,547,854

INTERCOMMUNICATION APPARATUS

Richard H. Campbell, Racine, Wis., assignor to Webster Electric Company, Racine, Wis., a corporation of Delaware Application February 6, 1948, Serial No. 6,608

15 Claims. (Cl. 179—1)

The present invention relates to communication apparatus and particularly to intercommunicating apparatus of the loudspeaking type.

One of the primary objects of the present invention is to provide a new and improved communication apparatus signaling arrangement whereby one station can signal another.

A further object of the present invention is to provide communication apparatus with a new and improved signaling arrangement whereby one station can signal another in such manner that a signal device at the other station remains in operated condition until station selector means corresponding to the first station is operated at the other station to interconnect the two stations and, preferably, wherein the signal device remains in operated condition until the selector switch means is returned to its original position subsequent to the completion of the communication between the two stations.

A further object of the present invention is to provide a new and improved communication system of the type including one or more remote stations and another station, in the nature of a central station, including reception and transmission amplifying means and switch means for selectively connecting the remote station to the input of the reception and to the output of the transmission amplifying means.

Other objects and advantages of the present invention will become apparent from the ensuing description of an embodiment thereof, in the course of which reference is had to the accompanying drawings, the single figure of which is a diagrammatic representation of communication apparatus embodying the invention.

The present invention is applicable to systems comprising a considerable number of stations, although but three have been illustrated in the figure. The three illustrated stations include a central station 1 and two remote stations 2 and 3. It should be understood, and it will become clear from the description following, that a considerable number of remote stations may be included in the system.

The remote stations have translating devices 10 utilizable both for reception and transmission and they may be loudspeakers of the dynamic type, including voice coils 12, each connected to an associated communication circuit shown as including the conductors 14 and 16. Inasmuch as the equipment at the remote stations and certain of the equipment at the central station associated with the remote stations are identical, only one set will be described, although like parts will be indicated by like reference characters.

The communication circuit 14, 16 extends between the two stations and it is connected at the central station to a station selector switch, indicated as a whole by reference character 20. The remote and central stations are also interconnected by a signal circuit which is illustrated as including the conductor 16. The signal circuit is normally open at the remote station, but is adapted to be closed upon the closure of the signaling switch 22 at the remote station. When this switch is closed, the conductor 16 is connected to ground, thereby to complete a signaling circuit to be described shortly.

The station selector switch 20 is selectively operable between two positions. It is indicated in position to close the signaling circuit and to open the communication circuit. The switch includes two switch blades 24 and 26, of which the latter closes the signaling circuit which, as already indicated, includes the conductor 16, and a conductor 28 leading to relay means 30 which may include a winding 32 and switch means operable thereby. The switch means includes switch blades 34 and 36, both of which are normally open.

The relay is adapted to be operated when the signaling switch 22 is closed. When the switch is closed, the winding 32 is energized from a suitable source of power such as the battery 38, one terminal of which is connected to the winding and the other to ground.

The signaling arrangement is such that the relay means is maintained in operated position even after a momentary closure of the signaling switch 22. It is so maintained by a locking circuit which is closed immediately the relay is operated. This circuit includes the switch blade 34, conductor 40, a normally closed switch blade 42, and ground conductor 44. The switch blade 42 is operable with the selector switch for a reason which will be made apparent shortly. The arrangement is thus such that even a momentary closing of the signaling switch results in the maintenance of the relay in its operated condition.

Signaling devices, preferably both visual and audible, are operable at the central station by the relay means and, in accordance with one of the important features of the present invention, the signaling arrangement is so constructed and arranged that both of the signaling devices are operated immediately the signaling switch 22 is operated at a remote station. The arrangement is also such that the audible signaling device is returned to nonoperated condition when the selector switch 20 is operated to connect the central station to the calling remote station. The visual signaling device, however, is not returned to nonoperated condition until after the signaling station selector switch is returned to its initial condition to break the communication circuit between the two stations and thus condition the signal circuit for operation from the remote station at some future time.

The visual and audible signaling devices may take various forms. In the illustrated embodiment of the invention, the visual signaling device 50 is an electric light, while the audible signaling device 52 is a buzzer. Both of the devices are adapted to be energized and operated upon operation of the relay 30. When the relay operates, it closes its switch blade 36, thereby to connect the light and buzzer to a suitable alternating current source of power, not shown, but adapted to be connected to the terminals 54. The energizing circuit for the light and buzzer extends from one of the terminals 54 to the light 50 through conductor 56, and thence to the buzzer through conductor 58, the switch blade 36, and conductor 60. The circuit is completed from the buzzer to the other terminal of the power source through the two ground connections 62 and 64.

When the signaling switch 22 is released and opened, the relay winding 32 remains energized through the locking circuit already described. As a result, both the visual and audible signals remain operative. When the station selector 20 at the central station is operated to complete the communication circuit, which includes the conductors 66 and 68 at the central station, the switch blade 42 is moved from one position to another. This movement results in the deenergization of the relay winding and the audible signaling device, but the visual signal remains operative until the station selector switch is returned to its original position.

The relay winding is deenergized upon operation of the station selector switch because switch blade 42 breaks the circuit between conductors 40 and 44, thereby breaking the relay locking circuit. When the relay is returned to its nonoperated position, the switch blade 36 opens its associated circuit to deenergize the buzzer. The visual signaling device 50, however, remains energized through another circuit completed by the switch blade 42 in its other position. This circuit includes the power supply terminals 54, conductor 56, light 50, conductor 70, the switch blade 42, and ground connections 44 and 64.

The visual signaling device is, however, deenergized and rendered inoperative when the station selector switch 20 is returned to its original position to condition the signaling circuit for further operation, as has been described above. This is an advantage because the visual signaling device 50 remains in operative condition until the station selector switch is returned to its original position, thereby giving an indication to an operator at the central station as to whether or not the selector switch has been properly returned to its original or normal position to condition the signal circuit for further operation.

Another feature of the present invention resides in the utilization of separate reception and transmission amplifying means which are adapted selectively to be connected to the communication circuit 66, 68.

The reception amplifying means, which may be of conventional type, is indicated by reference character 72. Its input is normally connected to the communication circuit 66, 68 through the pair of conductors 74 and the interconnected and simultaneously operable normally closed switch blades 76. The transmission amplifying means 78 is preferably of higher power so that it can be utilized to page a number or all of the remote stations at one time (through a circuit which has not been shown). Its output is adapted to be connected to the communication circuit 66, 68 through a step-down transformer 80 and the pair of conductors 82 engageable by the switch blades 76 in the second of two positions to which they are operable.

Suitable reproducing means, such as a loudspeaker 82, is connected to the output of amplifying means 72 through a volume control 84. Transmitting means, which may be a microphone 86, is connected to the input of amplifying means 78.

The switch blades 76 controlling the selective connection of the communication circuit to the reception and transmission amplifying means may be operated in suitable manner. In the illustrated embodiment the operation is by a relay 88 adapted to be energized from a battery 90 when a switch blade 92 is closed.

As already indicated, the apparatus at station 3 is like that at station 2. Also, the apparatus at the central station for station 3 is like that for station 2 except that the buzzer 52 and power supply are common to all the stations and the communication circuit 66, 68 is extended to station 3 through conductors 66—3 and 68—3. In order that the battery and buzzer may be used in common, conductors 56—3 and 60—3 are shown interconnecting the signaling device 50 and the circuit controlled by switch blade 36 at the two stations.

It is believed that the operation and advantages of the present invention will be apparent from the foregoing description. However, they will be reviewed briefly by following the operation from the time that a call is originated, say at station 2, until the call has been completed. In this description of the operation, it is assumed that power is supplied to the various parts and that the switches occupy their normal indicated positions.

When station 2 desires to call the central station, the signaling switch 22 is closed momentarily to energize relay winding 32 from battery 38 to effect operation of switch blades 34 and 36. The former completes a locking circuit for the relay winding through the normally closed switch blade 42 associated with the station selector switch and the latter connects the light 50 and buzzer 52 to the power terminals 54, thereby to give the operator at station 1 both visual and audible signals that a call has been made. Should the operator at the central station not be present, the relay, remaining in operated position, continues to provide the audible and visual signals until the operator returns.

In answering the call, the operator at station 1 operates the station selector switch to interconnect the communication circuit 14, 16 and 66, 68, thereby to return the relay to its nonoperated position and to deenergize buzzer 52. The signal light 50, however, remains energized through a circuit including the switch blade 42 until such time as the station selector switch is returned to its initial normal position.

After the communication circuit has been established, as described above, communication may be carried on between the two stations in alternate directions under the control of the operator at station 1. For transmission from station 1 to station 2, the switch 92 is closed to energize relay 88 to operate switch blade 76 to connect the output of the transmission amplifying means to the interstation communication circuit. For reception, the switch blade 92 is opened, with the result that the switch blades 76 return to their normal position, whereby the communication circuit is connected to the input of the reception amplifying means 72.

After a call has been completed, the switch 20 is returned to its initial indicated position. When this is done, the signal light 50 is deenergized, thus indicating to the operator at the central station that the system has been returned to its original condition.

Whenever the central station desires to call a remote station, all that is necessary is the operation of the selector switch 20 to interconnect the stations and operation of switch 92 to connect the output of the transmission amplifying means to the communication circuit.

While the present invention has been described in connection with the details of but a single embodiment thereof, it should be understood that these details are not intended to be limitative of the invention, except in so far as set forth in the accompanying claims.

What I claim as new and desire to secure by Letters Patent of the United States is:

1. Communication apparatus including a first station, a second station, a signaling circuit between said stations, a communication circuit between said stations, signaling switch means at the first station operable to a predetermined position to change the condition of said signaling circuit, relay means at the second station connected to said signaling circuit and operable in response to said change in condition of said circuit, a signal device at the second station, means controlling said device controlled by said relay means and operable to operate said device upon said operation of said relay means, means controlled by said relay means and operable thereby for maintaining said relay means in operated condition subsequent to operation of said switch means at said first station from its said predetermined position, and station selector switch means at said second station associated with said communication circuit including switch means controlling said relay means and signal device operable to a predetermined position for returning said relay means to a nonoperated condition and maintaining said signaling device in operated condition as long as said selector switch means is in said predetermined position.

2. Communication apparatus including a first station, a second station, a normally open signaling circuit between said stations, a normally open communication circuit between said stations, a switch at the first station closable to complete said signaling circuit, a relay at the second station in said signaling circuit energizable upon completion of said circuit, a signal device at the second station, a signal device energizing circuit and a switch in said circuit for energizing said device upon said operation of said relay, a relay locking circuit and a switch therein operable by said relay for maintaining said relay operated subsequent to opening of said switch at said first station, a station selector switch at said second station operable to complete said communication circuit, and a normally closed switch in circuit with said switch in circuit with said signal device controlling said relay and signal device operable with said station selector switch to a second position for opening the relay circuit to deenergize the relay and completing another energizing circuit for said signaling device.

3. Communication apparatus including a first station, a second station, a signaling circuit between said stations, a communication circuit between said stations, signaling switch means at the first station operable to a predetermined position to change the condition of said signaling circuit, relay means at the second station connected to said signaling circuit and operable in response to said change in condition of said circuit, a signal device at the second station, means controlling said device controlled by said relay means and operable to operate said device upon said operation of said relay means, means controlled by said relay means and operable thereby for maintaining said relay means in operated condition subsequent to operation of said switch means at said first station from its said predetermined position, and station selector switch means at said second station associated with said communication circuit including switch means controlling said relay means and signal device operable to a predetermined position for returning said relay means and signaling device to a non-operated condition.

4. Communication apparatus including a first station, a second station, a normally open signaling circuit between said stations, a normally open communication circuit between said stations, a switch at the first station closable to complete said signaling circuit, a relay at the second station in said signaling circuit energizable upon completion of said circuit, a signal device at the second station, a signal device energizing circuit and a switch in said circuit for energizing said device upon said operation of said relay, a relay locking circuit and a switch therein operable by said relay for maintaining said relay operated subsequent to opening of said switch at said first station, and a station selector switch at said second station operable to complete said communication circuit including a normally closed switch in circuit with said relay operated locking circuit switch and controlling said relay operable with said station selector switch to open the relay locking circuit and deenergize the relay and signaling device.

5. Communication apparatus including a first station, a second station, a signaling circuit between said stations, a communication circuit between said stations, signaling switch means at the first station operable to a predetermined position to change the condition of said signaling circuit, relay means at the second station connected to said signaling circuit and operable in response to said change in condition of said circuit, visual and audible signal devices at the second station, means controlling said devices controlled by said relay means and operable to operate said devices upon said operation of said relay means, means controlled by said relay means and operable thereby for maintaining said relay means in operated condition subsequent to operation of said switch means at said first station from its said predetermined position, and station selector switch means at said second station associated with said communication circuit including switch means controlling said relay means and signal devices operable to a predetermined position for returning said relay means and audible signal device to a nonoperated condition and maintaining said visual signaling device in operated condition as long as said selector switch means is in said predetermined position.

6. Communication apparatus including a first station, a second station, a normally open signaling circuit between said stations, a normally open communication circuit between said stations, a switch at the first station closable to complete said signaling circuit, a relay at the second station in said signaling circuit energizable upon completion of said circuit, visual and audible signal devices at the second station, an energizing circuit for said devices and a switch in said circuit operable by said relay for energizing said devices upon said operation of said relay, a relay locking circuit and a switch therein operable by said relay for maintaining said relay operated subsequent to opening of said switch at said first station, a station selector switch at said second station operable to complete said communication circuit, a normally closed switch in circuit with said switch in circuit with said signal device operable with said selector switch controlling said relay and signal device operable to a second position for opening the relay and audible signal device circuits and completing another energizing circuit for said visual signaling device.

7. Communication apparatus including, a signaling circuit, a communication circuit, relay means connected to said signaling circuit and operable in response to a momentary change in condition of said circuit, a signal device, means controlling said device controlled by said relay means and operable to operate said device upon said operation of said relay means, means controlled by said relay means and operable thereby for locking said relay means in operated condition, and station selector switch means associated with said communication circuit controlling said relay means and signal device operable to a predetermined position for returning said relay means to a non-operated condition and maintaining said signaling device in operated condition.

8. Communication apparatus including a signaling circuit, a communication circuit, a relay in said signaling circuit energizable upon momentary completion of said circuit, a signal device, an energizing circuit and a switch in said circuit for energizing said device upon said operation of said relay, a locking circuit and a switch therein operable by said relay for maintaining said relay operated, a station selector switch operable to close said communication circuit, and a normally closed switch in circuit with said switch in circuit with said signal device operable with said selector switch controlling said relay and signal device operable to a second position for opening the relay circuit and deenergizing the relay and completing another energizing circuit for said signaling device.

9. Communication apparatus including, a first station having a single translating device utilizable both as a receiver and a transmitter, a second station including reception amplifying means, separate transmission amplifying means, separate receiving and transmitting means connected respectively to said reception and transmission amplifying means, and means including a two way interstation communication circuit adapted to be connected to said translating device interconnecting said stations, and selectively operable switch means connected to said circuit for selectively connecting said circuit to either said receiving or transmission amplifying means.

10. Communication apparatus including, a first station having a single translating device utilizable both as a receiver and a transmitter, a second station including reception amplifying means, separate transmission amplifying means, separate receiving and transmitting means connected respectively to said reception and transmission amplifying means, and means including a two way interstation communication circuit adapted to be connected to said translating device interconnecting said stations, selectively operable switch means connected to said circuit operable selectively to connect said circuit to either said receiving or transmission amplifying means, and selectively operable relay means for operating said manually controlled switch means.

11. Communication apparatus including, a first station having a single translating device utilizable both as a receiver and a transmitter, a second station including reception amplifying means, separate transmission amplifying means, separate receiving and transmitting means connected respectively to said reception and transmission amplifying means, means including a two way interstation communication circuit adapted to be connected to said translating device interconnecting said stations and selectively operable switch means connected to said circuit for selectively connecting said circuit to either said receiving or transmission amplifying means, and a step-down transformer interposed between said transmission amplifying means and said switch means.

12. Communication apparatus including a first station, a second station, a signaling circuit between said stations, a communication circuit between said stations, signaling switch means at the first station operable to a predetermined position to change the condition of said signaling circuit, relay means at the second station connected to said signaling circuit and operable in response to said change in condition of said circuit, means controlled by said relay means and operable thereby for maintaining said relay means in operated condition subsequent to operation of said switch means at said first station from its said predetermined position, and station selector switch means at said second station associated with said communication circuit including switch means controlling said relay means operable to a predetermined position for returning said relay means to a nonoperated condition.

13. Communication apparatus including a first station, a second station, a normally open signaling circuit between said stations, a normally open communication circuit between said stations, a switch at the first station closable to complete said signaling circuit, a relay at the second station in said signaling circuit energizable upon completion of said circuit, a relay locking circuit and a switch therein operable by said relay for maintaining said relay operated subsequent to opening of said switch at said first station, and a station selector switch at said second station operable to complete said communication circuit and including a normally closed switch in circuit with said relay operated locking circuit switch operable with said station selector switch to open the relay circuit and deenergize the relay.

14. Communication apparatus including, a signaling circuit, a communication circuit, relay means connected to said signaling circuit and operable in response to a momentary change in condition of said circuit, means controlled by said relay means and operable thereby for locking said relay means in operated condition, and station selector switch means associated with said communication circuit controlling said relay means operable to a predetermined position for returning said relay means to a nonoperated condition.

15. Communication apparatus including a signaling circuit, a communication circuit, a relay in said signaling circuit energizable upon momentary completion of said circuit, a signal device, an energizing circuit and a switch in said circuit for energizing said device upon said operation of said relay, a locking circuit and a switch therein operable by said relay for maintaining said relay operated, a station selector switch operable to close said communication circuit, and a normally closed switch in circuit with said locking circuit switch controlling said relay and thereby said signal device and operable with said selector switch for opening the relay circuit and deenergizing the relay.

RICHARD H. CAMPBELL.

REFERENCES CITED

The following references are of record in the file of this patent:

UNITED STATES PATENTS

| Number | Name | Date |
|---|---|---|
| 2,302,498 | Kolehmainen | Nov. 17, 1942 |
| 2,326,617 | Campbell | Aug. 10, 1943 |
| 2,339,678 | Campbell | Jan. 18, 1944 |
| 2,347,079 | Campbell | Apr. 18, 1944 |
| 2,377,672 | Campbell | June 5, 1945 |
| 2,385,515 | Herrick | Sept. 25, 1945 |